United States Patent
Kuroe et al.

(10) Patent No.: US 10,870,406 B2
(45) Date of Patent: Dec. 22, 2020

(54) VEHICLE AIR BAG APPARATUS

(71) Applicant: HONDA MOTOR CO., LTD., Tokyo (JP)

(72) Inventors: Takeshi Kuroe, Wako (JP); Kohei Oshima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 16/214,276

(22) Filed: Dec. 10, 2018

(65) Prior Publication Data

US 2019/0217802 A1 Jul. 18, 2019

(30) Foreign Application Priority Data

Jan. 15, 2018 (JP) ................................. 2018-004565

(51) Int. Cl.
| | |
|---|---|
| *B60R 21/216* | (2011.01) |
| *B62J 27/00* | (2020.01) |
| *B60R 21/215* | (2011.01) |
| *B60R 21/00* | (2006.01) |
| *B60R 21/16* | (2006.01) |
| *B60R 21/237* | (2006.01) |

(52) U.S. Cl.
CPC .......... *B60R 21/216* (2013.01); *B60R 21/215* (2013.01); *B62J 27/00* (2013.01); *B60R 21/237* (2013.01); *B60R 2021/0088* (2013.01); *B60R 2021/161* (2013.01)

(58) Field of Classification Search
CPC .............................................. B60R 21/21656
See application file for complete search history.

(56) References Cited

U.S. PATENT DOCUMENTS

| | | | |
|---|---|---|---|
| 5,474,324 A | 12/1995 | Bentley et al. | |
| 6,488,309 B1 * | 12/2002 | Malczyk | B60R 21/2165 280/728.3 |
| 7,497,464 B2 * | 3/2009 | Horiuchi | B60R 21/2165 280/728.2 |

(Continued)

FOREIGN PATENT DOCUMENTS

| | | |
|---|---|---|
| DE | 19701106 A1 * 7/1998 | ....... B60R 21/21656 |
| DE | 10040430 A1 11/2001 | |

(Continued)

OTHER PUBLICATIONS

European Search Report dated Feb. 19, 2019, 7 pages.

(Continued)

*Primary Examiner* — Nicole T Verley
(74) *Attorney, Agent, or Firm* — Rankin, Hill & Clark LLP

(57) ABSTRACT

A vehicle air bag apparatus includes an air bag disposed anterior to an occupant seat, a peripheral wall portion that surrounds the air bag from outside, and a lid upper wall portion that closes an upper surface opening in the peripheral wall portion, the air bag being inflated and deployed outward through the upper surface opening. The vehicle air bag apparatus includes a rib, disposed in a rear-side corner portion that assumes a portion at which an upper end portion of the peripheral wall portion is connected with the lid upper wall portion. The rib connects the upper end portion of the peripheral wall portion with the lid upper wall portion.

6 Claims, 14 Drawing Sheets

(56) References Cited

U.S. PATENT DOCUMENTS

| | | | | |
|---|---|---|---|---|
| 7,703,799 B2* | 4/2010 | Takagi | ............... | B60R 21/21656 |
| | | | | 280/728.3 |
| 7,900,955 B2* | 3/2011 | Kobayashi | ............... | B60R 21/16 |
| | | | | 280/728.2 |
| 9,463,768 B2* | 10/2016 | Tanabe | .................. | B60R 21/276 |
| 10,377,336 B2* | 8/2019 | Lu | ......................... | B60R 21/205 |
| 2007/0278772 A1* | 12/2007 | Burghardt | ............ | B60R 21/2037 |
| | | | | 280/731 |
| 2019/0351859 A1* | 11/2019 | Rhodes | ................. | B60R 21/215 |

FOREIGN PATENT DOCUMENTS

| | | |
|---|---|---|
| JP | H07-125597 A | 5/1995 |
| JP | 2002-087197 | 3/2002 |
| JP | 2004-338658 A | 12/2004 |
| JP | 2007-216738 | 8/2007 |
| JP | 2007-290409 A | 11/2007 |
| JP | 2011-000962 | 1/2011 |
| JP | 2011-000969 | 1/2011 |
| JP | 2014-166835 A | 9/2014 |

OTHER PUBLICATIONS

Japanese Office Action dated Jan. 7, 2020, English abstract included, 9 pages.

Japanese Office Action with English translation dated May 14, 2019, 11 pages.

\* cited by examiner

US 10,870,406 B2

VEHICLE AIR BAG APPARATUS

INCORPORATION BY REFERENCE

The present application claims priority under 35 U.S.C. § 119 to Japanese Patent Application No. 2018-004565 filed on Jan. 15, 2018. The content of the application is incorporated herein by reference in its entirety.

TECHNICAL FIELD

The present invention relates to a vehicle air bag apparatus.

BACKGROUND ART

A known vehicle air bag apparatus includes an air bag disposed anterior to an occupant seat, a peripheral wall portion that surrounds the air bag from outside, and an upper wall portion that closes an upper surface opening in the peripheral wall portion. In the known vehicle air bag apparatus, the air bag is inflated and deployed outward through the upper surface opening (see, for example, Patent Document 1). Patent Document 1 discloses a configuration including restricting means mounted on the outside of a retaining box that includes the peripheral wall portion and the restricting means varies opening of the upper wall portion to thereby vary a direction in which the air bag is deployed.

PRIOR ART DOCUMENT

Patent Document

[Patent Document 1]
Japanese Patent Application Laid-open No. 2011-962

SUMMARY OF THE INVENTION

Problem to be Solved by the Invention

In the known air bag apparatus described above, however, the direction in which the air bag is deployed is varied by the restricting means that is a link mechanism. This configuration leads to a complicated structure.

The present invention has been made in view of the foregoing situation and it is an object of the present invention to enable, in a vehicle air bag apparatus, a direction in which an air bag is deployed to be varied by a simple structure.

Means for Solving the Problem

To achieve the foregoing object, an aspect of the present invention provides a vehicle air bag apparatus that includes: an air bag (35) disposed anterior to an occupant seat (14), a peripheral wall portion (70) that surrounds the air bag (35) from outside, and an upper wall portion (51) that closes an upper surface opening (50a) in the peripheral wall portion (70), the air bag (35) being inflated and deployed outward through the upper surface opening (50a). The vehicle air bag apparatus includes at least one rib (67), disposed in a part (65c) of a portion (65) at which an upper end portion of the peripheral wall portion (70) is connected with the upper wall portion (51), for connecting the upper end portion of the peripheral wall portion (70) with the upper wall portion (51).

In the aspect of the present invention, preferably, the at least one rib (67) connects an inner surface of the peripheral wall portion (70) with an inner surface of the upper wall portion (51).

In the aspect of the present invention, preferably, the upper wall portion (51) has a curved shape that is curved in a height direction of the upper wall portion (51), and a plurality of the ribs (67) each have a vertical length variable according to a height of the upper wall portion (51) variable according to a curvature of the upper wall portion (51).

In the aspect of the present invention, preferably, the vehicle air bag apparatus further includes: a retainer (33) in which the air bag (35) is housed; and a lid (34) disposed on the retainer (33). The retainer (33) includes a retainer peripheral wall portion (45) that surrounds the air bag (35) from outside. The lid (34) includes a lid upper wall portion (51) that covers the upper surface opening (50a) and a lid peripheral wall portion (50) that fits in the retainer peripheral wall portion (45) from above. The retainer peripheral wall portion (45) and the lid peripheral wall portion (50) constitute the peripheral wall portion (70) and the lid upper wall portion (51) constitutes the upper wall portion (51). The ribs (67) are disposed on the lid upper wall portion (51) and the lid peripheral wall portion (50).

In the aspect of the present invention, preferably, the vehicle air bag apparatus further includes a decorative board (19), disposed to be joined to the upper wall portion (51), for covering a vehicle body. The upper wall portion (51) has a flange portion (60) formed on an outer peripheral portion thereof, the flange portion (60) extending outwardly, and the decorative board (19) has an end edge (19a) overlapping from above the flange portion (60).

In the aspect of the present invention, preferably, the vehicle air bag apparatus further includes reinforcement members (37, 38) fixed to an outer surface of the peripheral wall portion (70).

In the aspect of the present invention, preferably, in a top view, the upper wall portion (51) has a recessed portion (58), which is recessed inwardly, and protruded portions (59), which are disposed on both sides of the recessed portion (58), formed at a front edge portion thereof. The decorative board (19) is disposed in the recessed portion (58). The peripheral wall portion (70) has a notch (62a) formed in an outer surface thereof at a portion inferior to the recessed portion (58) and a notch (62b) formed in an inner surface thereof at portions inferior to the protruded portions (59).

In the aspect of the present invention, preferably, the peripheral wall portion (70) has notches (63) formed in left and right side walls (54) thereof.

In the aspect of the present invention, preferably, the peripheral wall portion (70) includes a front wall (52) that covers the air bag (35) from front, the side walls (54) that cover the air bag (35) from left and right, and a rear wall (53) that covers the air bag (35) from rear. The ribs (67) connect the rear wall (53) with the upper wall portion (51).

Effects of the Invention

In accordance with the vehicle air bag apparatus in the aspect of the present invention, the air bag apparatus includes the air bag disposed anterior to the occupant seat, the peripheral wall portion that surrounds the air bag from outside, and the lid upper wall portion that closes the upper surface opening in the peripheral wall portion. The air bag is inflated and deployed outward through the upper surface opening. The rib, which connects the upper end portion of the peripheral wall portion with the upper wall portion, is disposed at a portion forming part of the portion that connects the upper end portion of the peripheral wall portion with the upper wall portion.

The foregoing configuration allows the rib, which connects the upper end portion of the peripheral wall portion with the upper wall portion, to enhance strength of the portion that forms part of the portion that connects the upper end portion of the peripheral wall portion with the upper wall portion, so that a degree of opening of the upper wall portion when the air bag is deployed can be adjusted. Thus, the direction in which the air bag is deployed can be varied using the simple structure including the rib.

In the aspect of the present invention, the rib may connect the inner surface of the peripheral wall portion with the inner surface of the upper wall portion. This configuration allows the rib to be hidden inside the peripheral wall portion and the upper wall portion, thus improving appearance.

In the aspect of the present invention, the upper wall portion may have a curved shape curving in the height direction of the upper wall portion and the ribs, provided in plurality, have vertical lengths variable according to heights of the upper wall portion variable according to a curvature. The foregoing configuration allows the lengths of the ribs to be appropriately set even with the curved shape of the upper wall portion. Thus, a degree of freedom in the shape of the upper wall portion can be ensured and the direction in which the air bag is deployed can be varied through a simple structure incorporating the ribs.

In the aspect of the present invention, the air bag apparatus may include the retainer, in which the air bag is housed, and the lid that is mounted on the retainer. The retainer includes the retainer peripheral wall portion that surrounds the air bag from outside. The lid includes the lid upper wall portion, which covers the upper surface opening, and the lid peripheral wall portion, which is fitted in the retainer peripheral wall portion from above. The retainer peripheral wall portion and the lid peripheral wall portion constitute the peripheral wall portion. The lid upper wall portion constitutes the upper wall portion. The ribs may be disposed in the lid upper wall portion and the lid peripheral wall portion.

The foregoing configuration allows the simple structure incorporating the ribs, which are disposed in the lid upper wall portion and the lid peripheral wall portion of the lid mounted on the retainer, to vary the direction in which the air bag is deployed. Additionally, the structure of the retainer can be simplified because there is no need to provide the retainer with the ribs for adjusting deployment of the air bag.

In the aspect of the present invention, the decorative board may be disposed to be joined to the upper wall portion to thereby cover the vehicle body. The lid wall portion has the flange portion formed on the outer peripheral portion thereof. The flange portion extends outwardly. The decorative board may have the end edge overlapping the flange portion from above. The foregoing configuration results in the end edge of the decorative board and the flange portion forming a labyrinth structure, so that a space inside the decorative board is hard to be visually recognized and appearance can be improved.

In the aspect of the present invention, the reinforcement members are fixed to the outer surface of the peripheral wall portion. This configuration allows the reinforcement members to prevent the peripheral wall portion from being deformed when the air bag is deployed, so that the air bag can be deployed in an appropriate direction. Furthermore, with the configuration including the decorative board, deformation of the decorative board accompanied by the deployment of the air bag can also be prevented.

In the aspect of the present invention, in a top view, the recessed portion, which is recessed inwardly, and the protruded portions, which are disposed on both sides of the recessed portion, are disposed at the front edge portion of the upper wall portion. The decorative board is disposed in the recessed portion. The peripheral wall portion has the notch formed in an outer surface thereof at a portion inferior to the recessed portion. The peripheral wall portion further has the notches formed in an inner surface thereof at portions inferior to the protruded portions.

The foregoing configuration allows the recessed portion to correctly position the decorative board. Additionally, the notches in the inner surface, disposed on both sides of the notch in the outer surface, allows the peripheral wall portion to fracture uniformly with ease, when fractured by the notches.

In the aspect of the present invention, the notches may be disposed in the side walls at left and right of the peripheral wall portion. This configuration allows the side walls at left and right of the peripheral wall portion to be fractured by the notches, so that the upper wall portion can be readily opened during deployment of the air bag.

Additionally, in the aspect of the present invention, the peripheral wall portion may include the front wall, which covers the air bag from the front, the side walls, which cover the air bag from left and right sides, and the rear wall, which covers the air bag from the rear. The ribs may connect the rear wall with the upper wall portion. The foregoing configuration enhances strength of the portion that connects the upper end portion of the rear wall with the upper wall portion. The foregoing configuration further results in the upper wall portion being opened using the upper end portion of the rear wall as a starting point. Thus, the air bag can be opened toward the front and the occupant can be appropriately protected.

MODE FOR CARRYING OUT THE INVENTION

Figure 1:
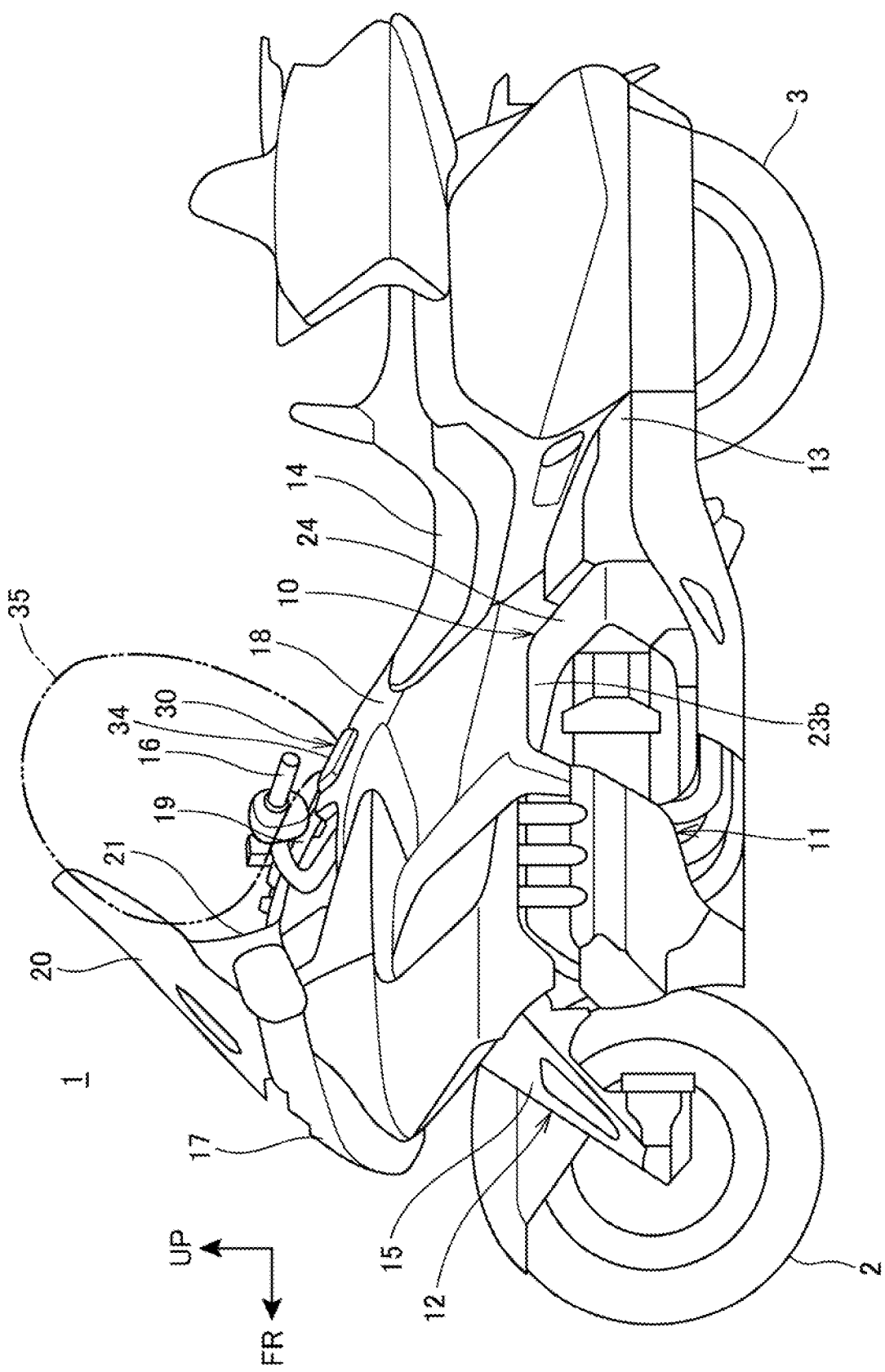
FIG. 1 is a left side elevation view of a motorcycle according to an embodiment of the present invention.

An embodiment to which the present invention is applied will be described below with reference to the accompanying drawings. Throughout the descriptions given hereunder, expressions indicating directions including front and rear, right and left, and upper and lower mean the same directions as those in a vehicle body unless otherwise specified. In the drawings, an arrow FR indicates an anterior direction of the vehicle body, an arrow UP indicates a superior direction of the vehicle body, and an arrow LH indicates a leftward direction of the vehicle body.

Figure 2:
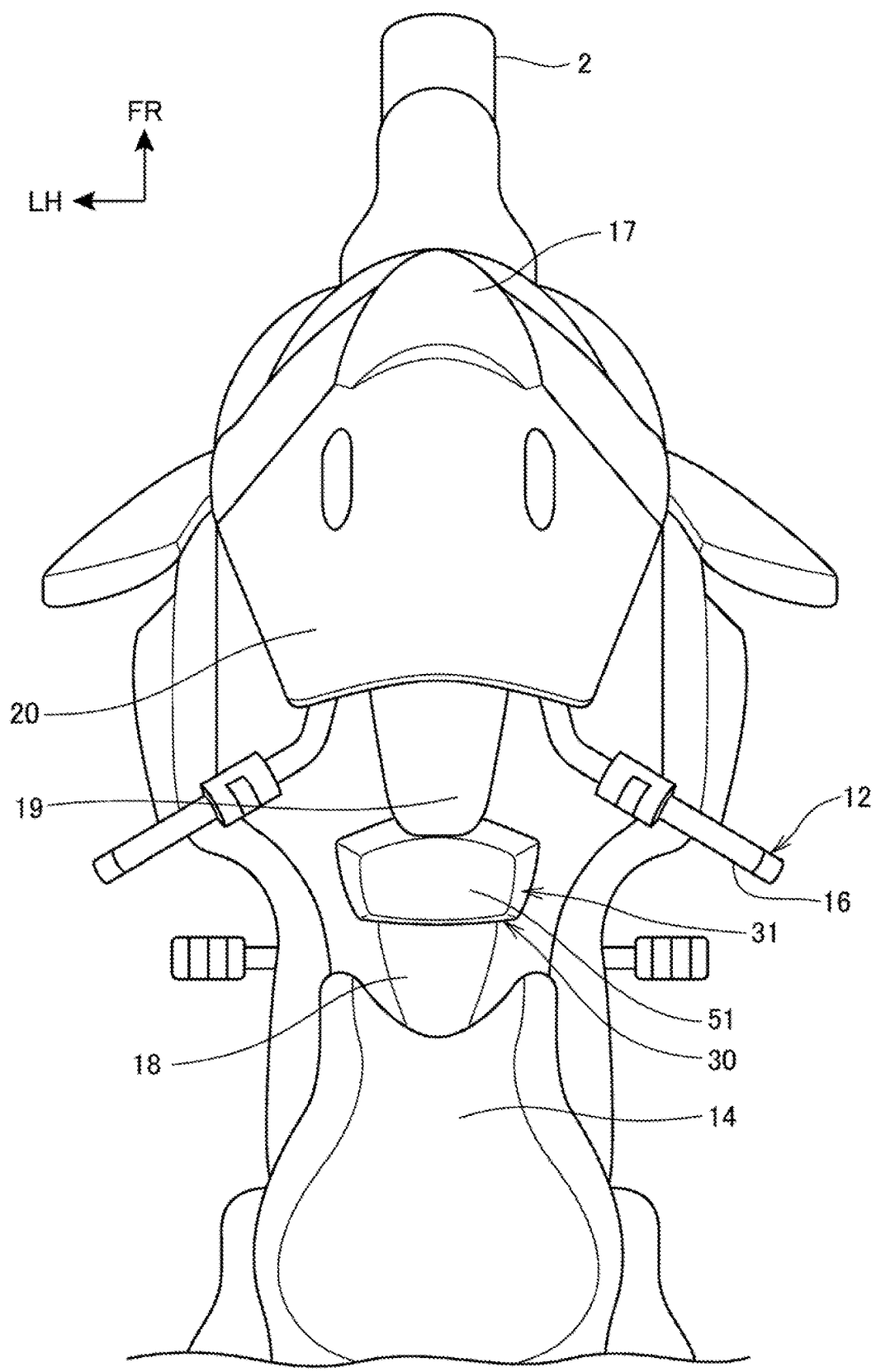
FIG. 2 is a plan view of a front portion of the motorcycle, as viewed from above.

FIG. 1 is a left side elevation view of a motorcycle 1 according to an embodiment of the present invention. FIG. 2 is a plan view of a front portion of the motorcycle 1, as viewed from above.

The motorcycle 1 (vehicle) includes a vehicle body frame 10, an engine 11, a front wheel 2, a steering system 12, a rear wheel 3, and a swing arm 13. The engine 11 as a power unit is supported on the vehicle body frame 10. The steering system 12 that steerably supports the front wheel 2 is steerably supported at a front end of the vehicle body frame 10. The swing arm 13 that supports the rear wheel 3 is disposed on a side of a rear portion of the vehicle body frame 10. The motorcycle 1 is a saddle riding vehicle in which a seat 14 which an occupant straddles is disposed superior to the rear portion of the vehicle body frame 10.

The steering system 12 includes a front fork 15 and a steering handlebar 16. The front fork 15 has a lower end portion supporting the front wheel 2. The steering handlebar 16 is disposed at an upper end portion of the front fork 15.

A vehicle body cover that covers a vehicle body including the vehicle body frame 10 and auxiliaries includes a front cover 17, a center cover 18, and a decorative board 19. The front cover 17 covers an area around the steering system 12. The center cover 18 is disposed between the steering handlebar 16 and the seat 14. The decorative board 19 extends from a front end portion of the center cover 18 toward the front.

The center cover 18 is disposed between the front cover 17 and the seat 14 and covers an area between the steering handlebar 16 and the seat 14 from above and lateral sides.

A windscreen 20 extends from an upper end portion of a front surface of the front cover 17 upwardly toward the rear. A meter unit 21 is disposed anterior to the steering handlebar 16 and inferior to the windscreen 20. The meter unit 21 displays information including a vehicle speed.

The decorative board 19, disposed at a center in a vehicle width, is a cover extending in a fore-aft direction from a front end portion of the center cover 18 up to a position near the meter unit 21.

The motorcycle 1 includes an air bag apparatus 30. The air bag apparatus 30 protects the occupant from impact.

The air bag apparatus 30 is disposed between the steering handlebar 16 and the seat 14 in the fore-aft direction, anterior to the seat 14.

Figure 3:
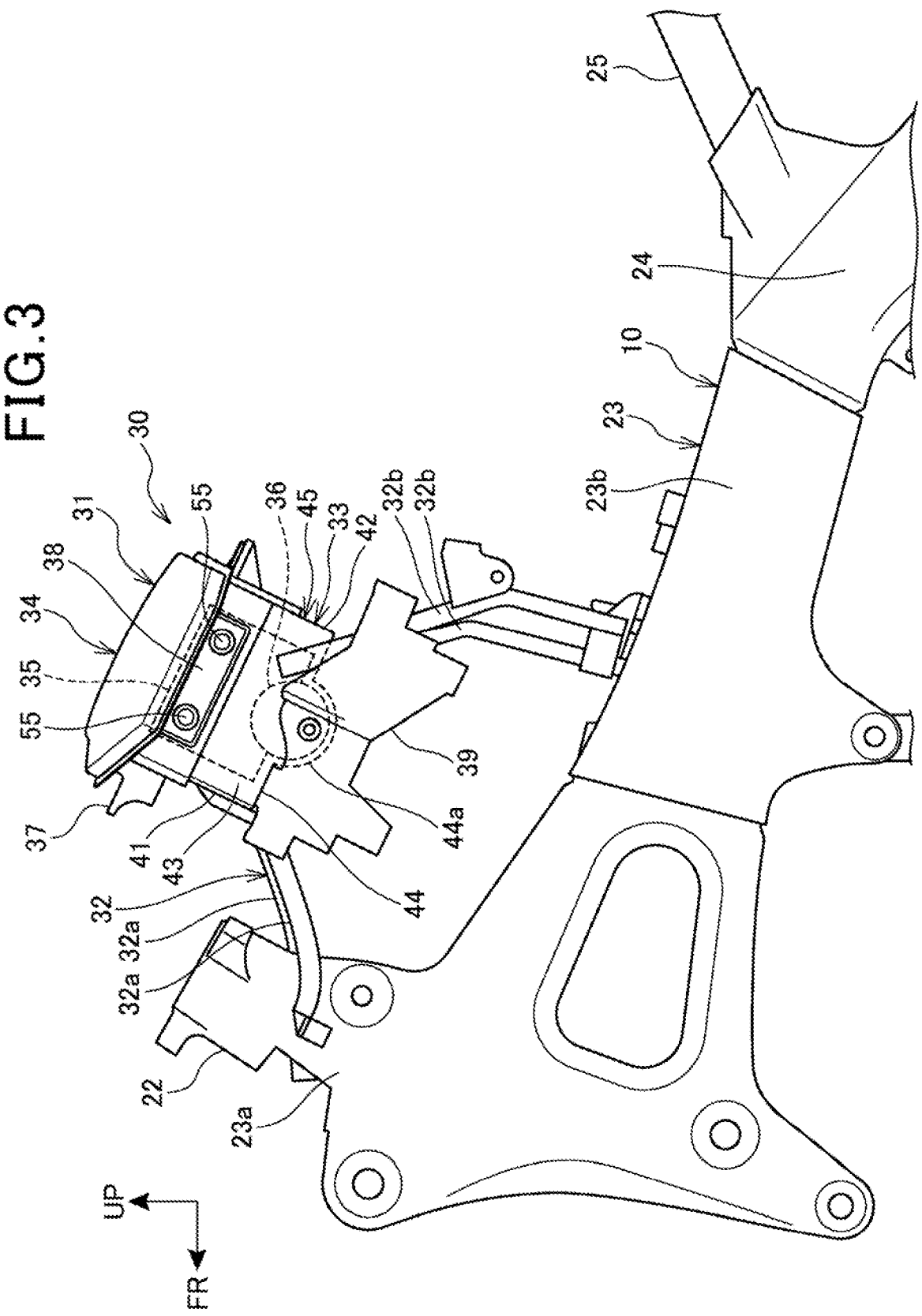
FIG. 3 is a left side elevation view of a condition in which an air bag apparatus is mounted on a vehicle body frame.
Figure 4:
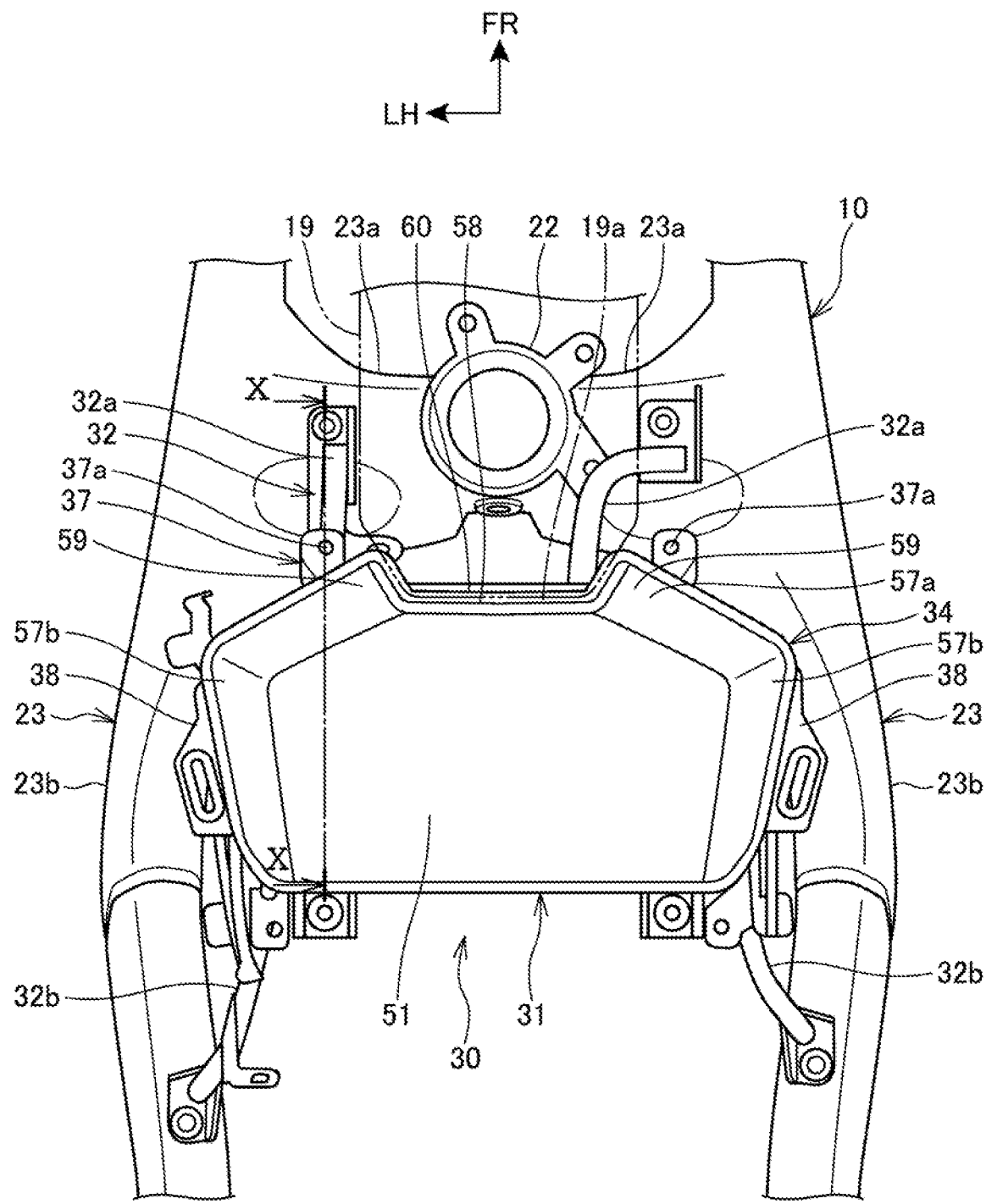
FIG. 4 is a plan view of the condition in which the air bag apparatus is mounted on the vehicle body frame, as viewed from above.

FIG. 3 is a left side elevation view of a condition in which the air bag apparatus 30 is mounted on the vehicle body frame 10. FIG. 4 is a plan view of the condition in which the air bag apparatus 30 is mounted on the vehicle body frame 10, as viewed from above. FIGS. 3 and 4 omit depicting parts other than the air bag apparatus 30 and the vehicle body frame 10.

Reference is made to FIGS. 1, 3, and 4. The vehicle body frame 10 includes a head pipe 22, a pair of left and right main frames 23, a pair of left and right pivot frames 24, and a pair of left and right seat frames 25. The head pipe 22 is disposed at the center in the vehicle width at a front end portion of the vehicle body frame 10. The main frames 23 extend from the head pipe 22 downwardly toward the rear. The pivot frames 24 extend downwardly from rear end portions of the main frames 23. The seat frames 25 extend rearward from upper portions of the pivot frames 24.

The head pipe 22 rotatably journals the front fork 15.

The main frames 23 each include an outer extension 23a and a main frame main unit 23b. The outer extension 23a extends outward in a vehicle width direction from a corresponding side surface of the head pipe 22. The main frame main unit 23b extends rearward from the outer extension 23a.

The engine 11 is disposed anterior to the pivot frames 24 and inferior to the main frames 23.

In a plan view, the air bag apparatus 30 is disposed posterior to the outer extensions 23a and between the left and right main frame main units 23b.

Reference is made to FIGS. 3 and 4. The air bag apparatus 30 includes a case-like air bag module 31 and a support frame 32. The support frame 32 supports the air bag module 31 on the vehicle body frame 10.

The air bag module 31 includes a retainer 33, a lid 34, an air bag 35, and an inflator 36. The retainer 33 has a box shape having an open upper surface. The lid 34 is mounted at an upper portion of the retainer 33. The air bag 35 is housed inside the retainer 33. The inflator 36 emits gas into the air bag 35.

The air bag module 31 further includes a front-surface reinforcement member 37 (reinforcement member) and side-surface reinforcement members 38 (reinforcement members). The front-surface reinforcement member 37 is disposed at a front surface of the air bag module 31. The side-surface reinforcement members 38 are disposed at left and right, respectively, of the air bag module 31.

The support frame 32 includes a pair of left and right front portion support frames 32a and a pair of left and right rear portion support frames 32b. The front portion support frames 32a extend from a front portion of the retainer 33 downwardly toward the front to thereby be connected with the outer extensions 23a of the main frames 23. The rear portion support frames 32b extend from a rear portion of the retainer 33 downwardly toward the rear to thereby be connected with the main frame main units 23b of the main frames 23.

Specifically, the air bag module 31 is supported by the support frame 32 extending upwardly from the main frames 23 and disposed superior to the main frames 23.

A stay 39 is disposed at a lower portion of the retainer 33. The stay 39 allows other parts to be mounted thereon.

Figure 5:
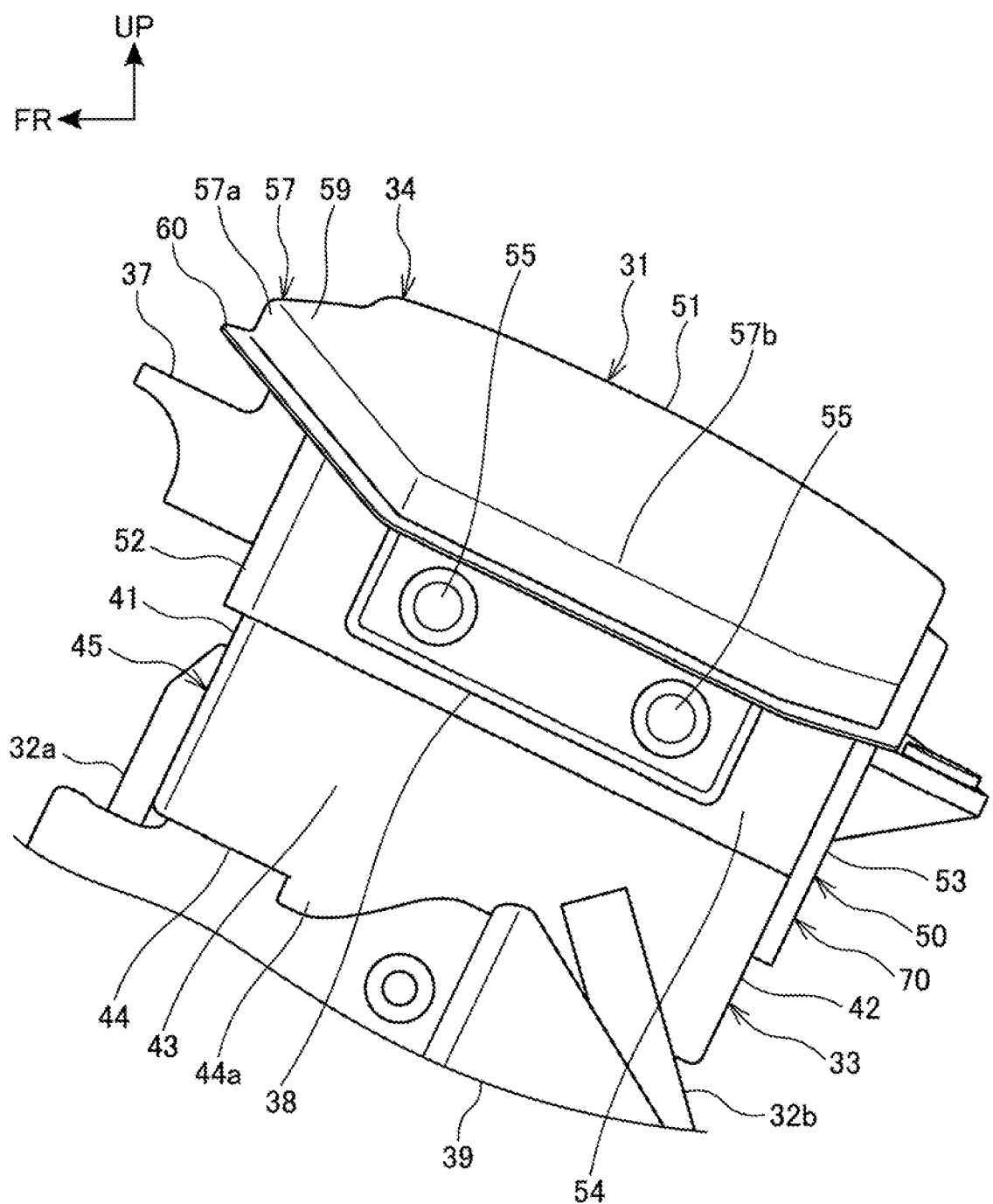
FIG. 5 is a left side elevation view of an air bag module.
Figure 6:
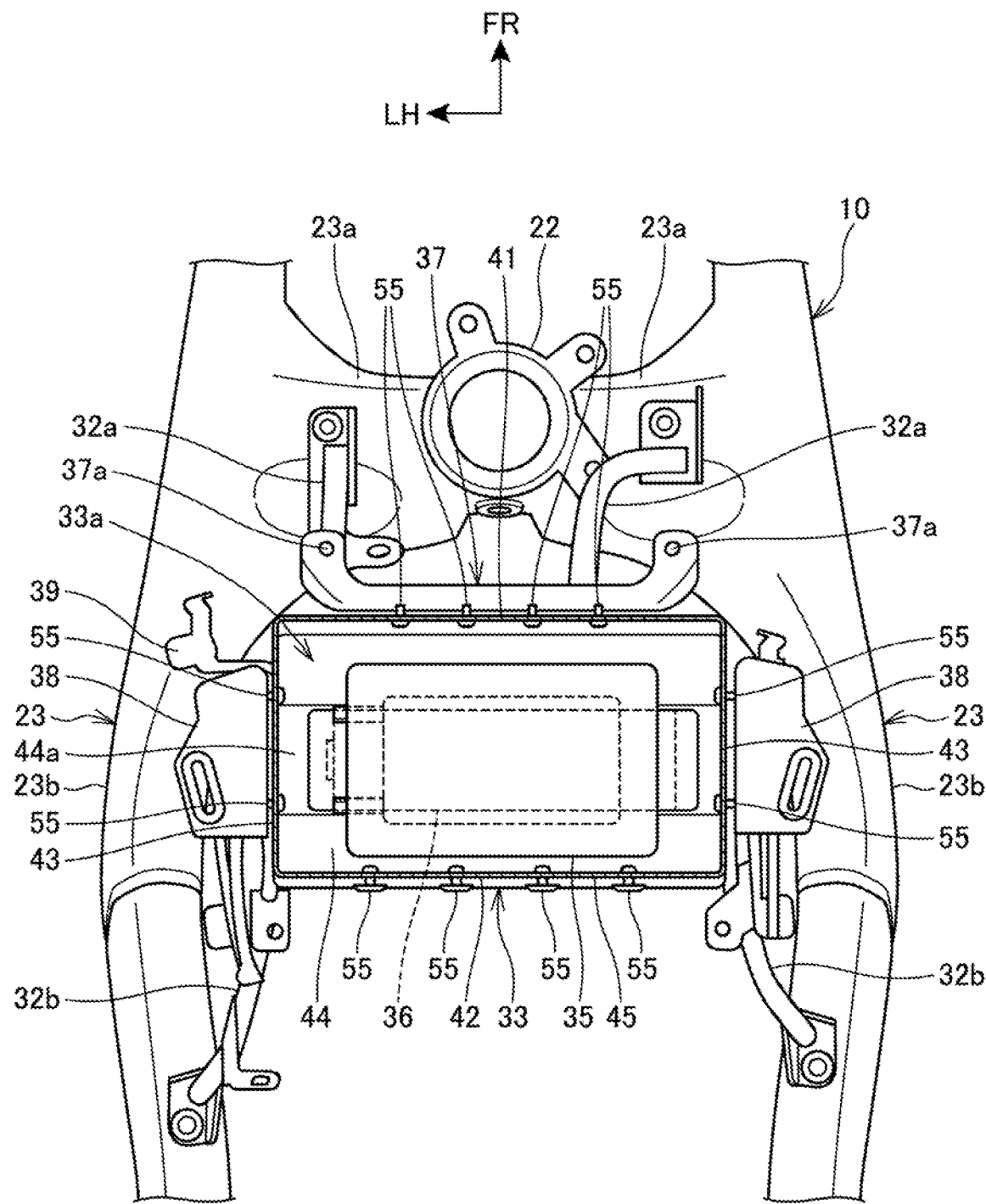
FIG. 6 is a plan view of the air bag module from which a lid has been removed, as viewed from above.

FIG. 5 is a left side elevation view of the air bag module 31. FIG. 6 is a plan view of the air bag module 31 from which the lid 34 has been removed, as viewed from above.

As depicted in FIGS. 5 and 6, the retainer 33 includes a retainer front wall 41, a retainer rear wall 42, a pair of left and right retainer side walls 43, and a lower wall 44. The retainer front wall 41 covers the air bag 35 from the front. The retainer rear wall 42 faces the retainer front wall 41. The retainer side walls 43 extend in the fore-aft direction to connect left and right side edges, respectively, of the retainer front wall 41 and the retainer rear wall 42. The lower wall 44 closes a lower surface of the retainer 33. The retainer 33 has a retainer upper surface opening 33a. The retainer 33 has an entire upper surface opening through the retainer upper surface opening 33a.

In a plan view, the retainer 33 is disposed in a position where the retainer front wall 41 and the retainer rear wall 42 extend straight in the vehicle width direction in parallel with each other. In a vehicle side view, the retainer front wall 41 and the retainer rear wall 42 are disposed to be inclined rearward relative to a vertical direction.

The retainer front wall 41, the retainer rear wall 42, and the retainer side walls 43 constitute a retainer peripheral wall portion 45. The retainer peripheral wall portion 45 surrounds the air bag 35 from outside. The retainer peripheral wall portion 45 has a substantially rectangular frame shape in a plan view.

The retainer 33 is formed of metal, for example, a ferrous material.

An inflator housing portion 44a is formed at a central portion in the fore-aft direction in the lower wall 44 of the retainer 33. The inflator housing portion 44a bulges downwardly.

The inflator 36 is formed into a cylinder extending in the vehicle width direction. The inflator 36 is housed in the inflator housing portion 44a and fixed to the lower wall 44. A gas generating agent and an initiator that causes the gas generating agent to initiate a reaction for generating gas are disposed inside the inflator 36. The initiator includes an ignition device.

The air bag 35 is a bag-shaped member attached to the inflator 36. The air bag 35 is inflated by gas being emitted into the bag from the inflator 36. The air bag 35 is housed, in a folded state, superior to the inflator 36 inside the retainer 33 and covered in the lid 34 from above.

The motorcycle 1 includes an acceleration sensor (not depicted) that detects impact acting on the motorcycle 1. The acceleration sensor is electrically connected with a control unit (not depicted) of the motorcycle 1 and the control unit is electrically connected with the inflator 36. The control unit determines whether to activate the air bag module 31 on the basis of the detected acceleration. To activate the air bag module 31, the control unit activates the inflator 36 to thereby emit gas into the air bag 35. The air bag 35 is inflated by pressure of the gas to thereby break to open the lid 34 and be deployed upwardly outside the retainer 33.

Figure 7:
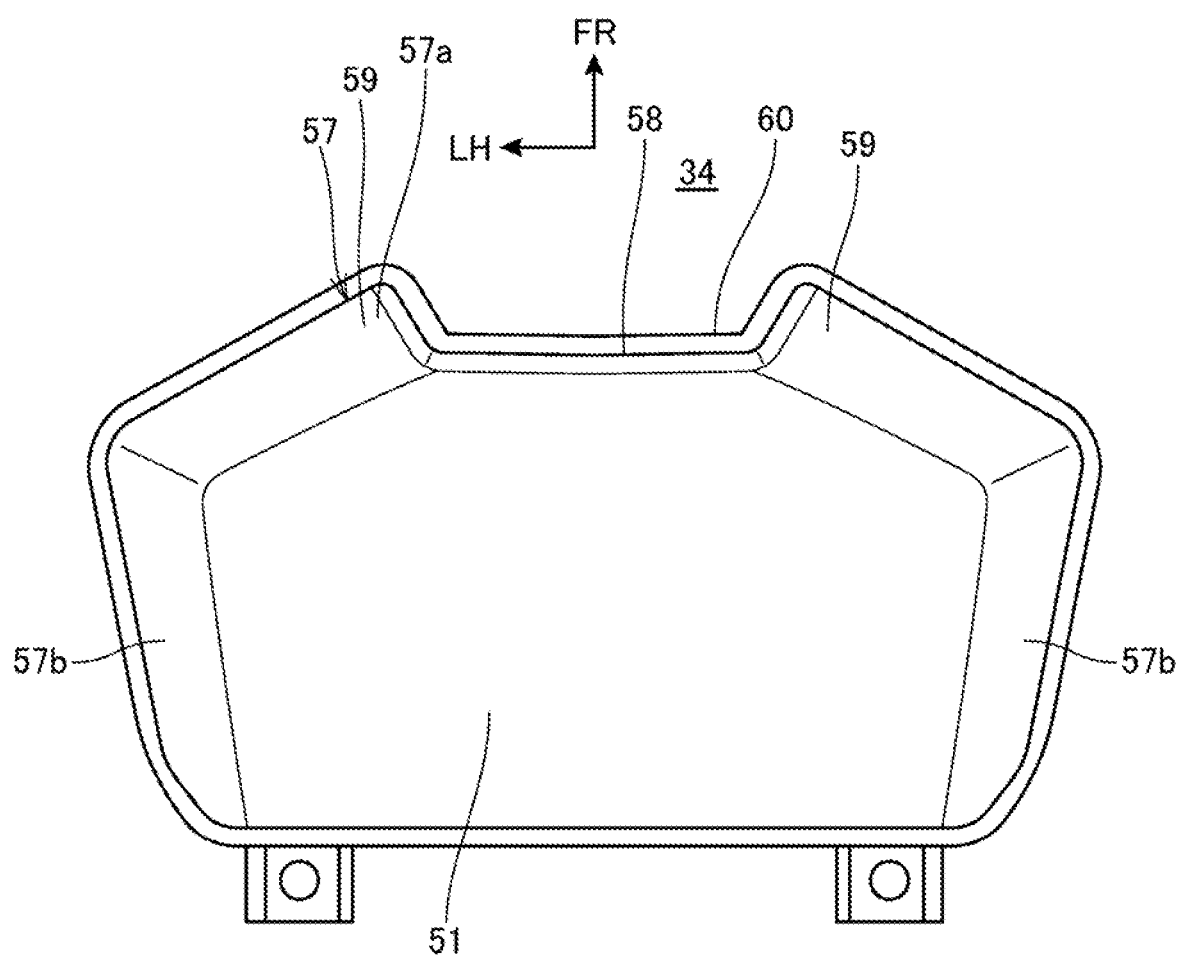
FIG. 7 is a plan view of the lid, as viewed from above.
Figure 8:
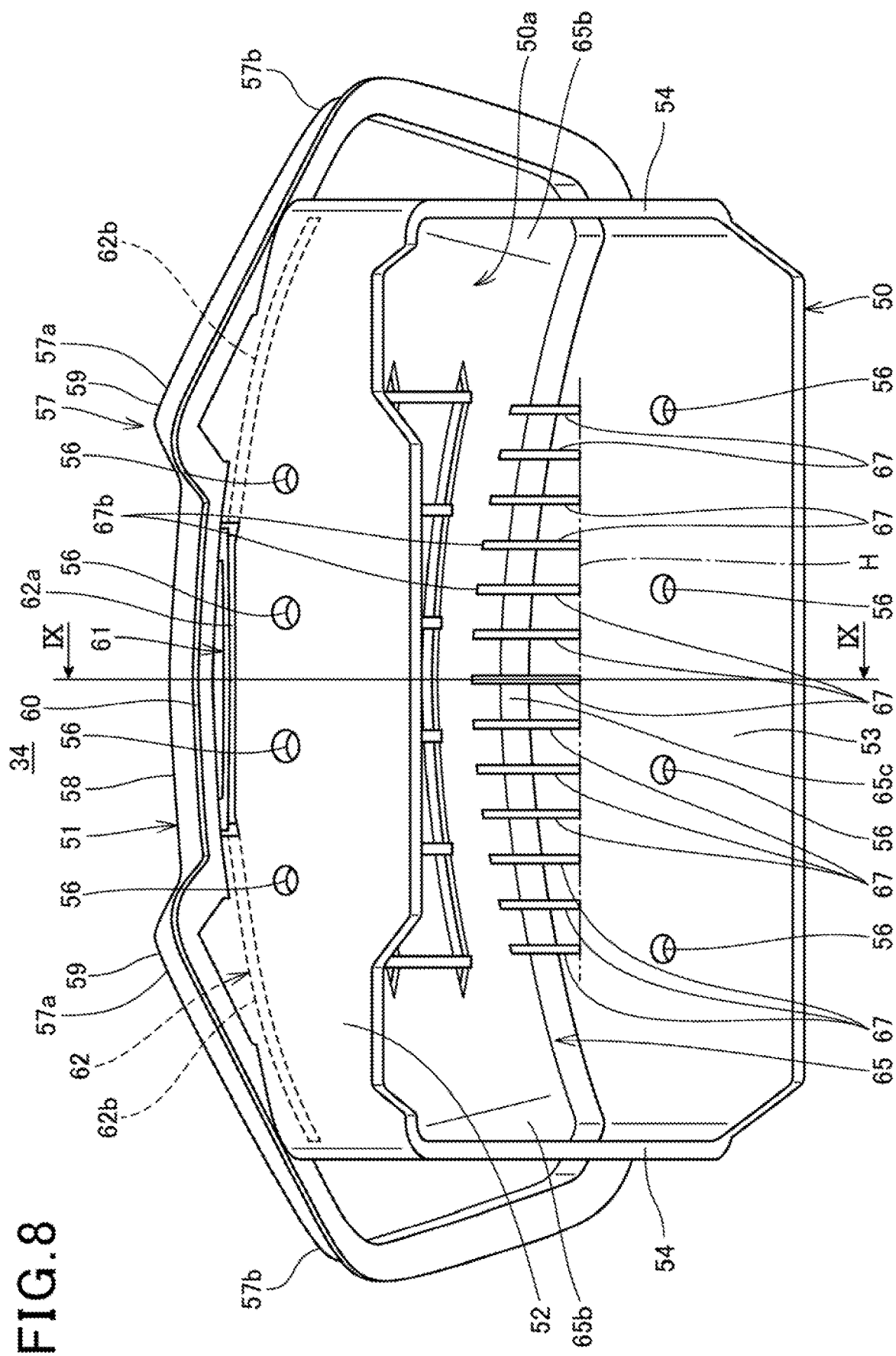
FIG. 8 is a perspective view of the lid, as viewed from a front lower side.
Figure 9:
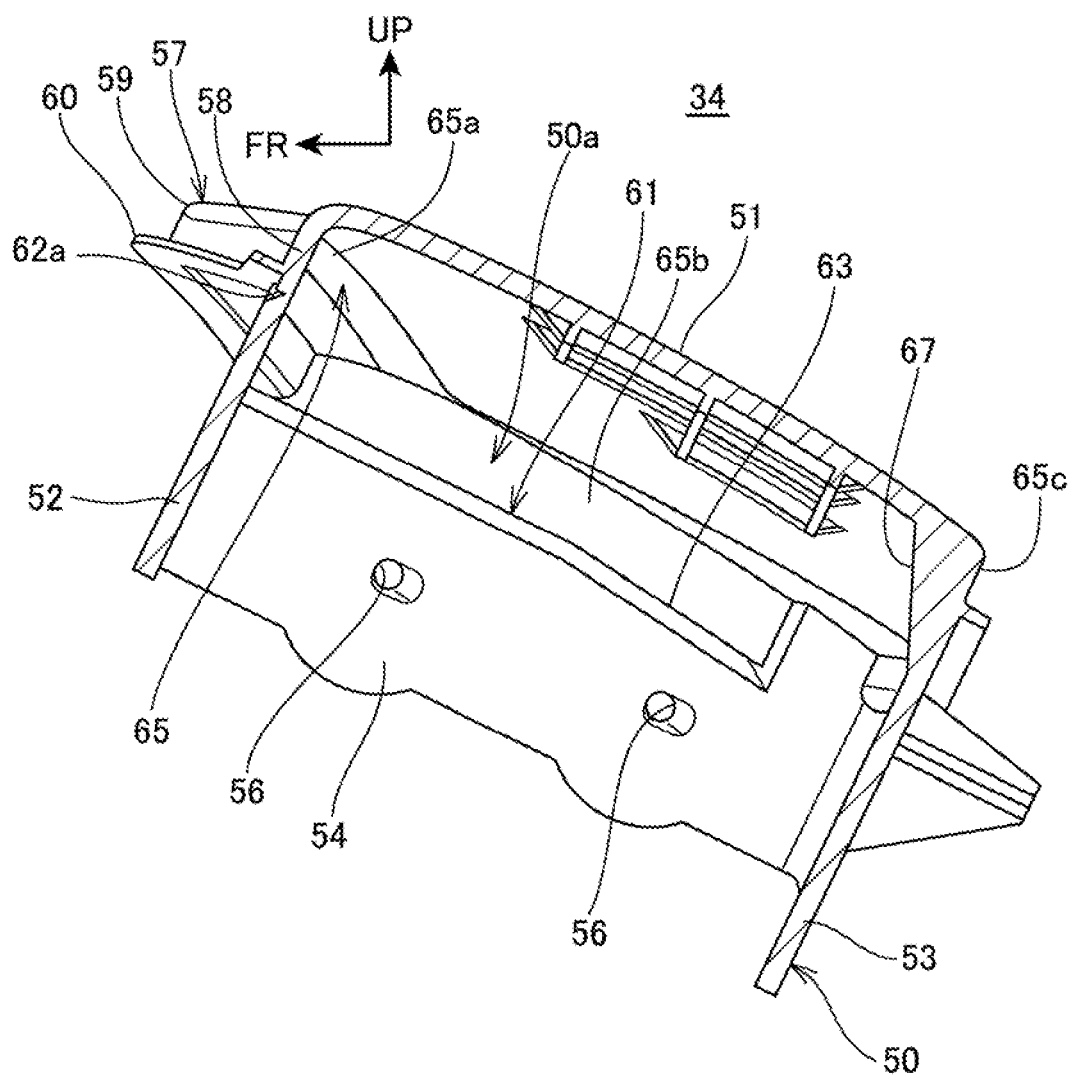
FIG. 9 is a cross-sectional view taken along line IX-IX in FIG. 8.
Figure 10:
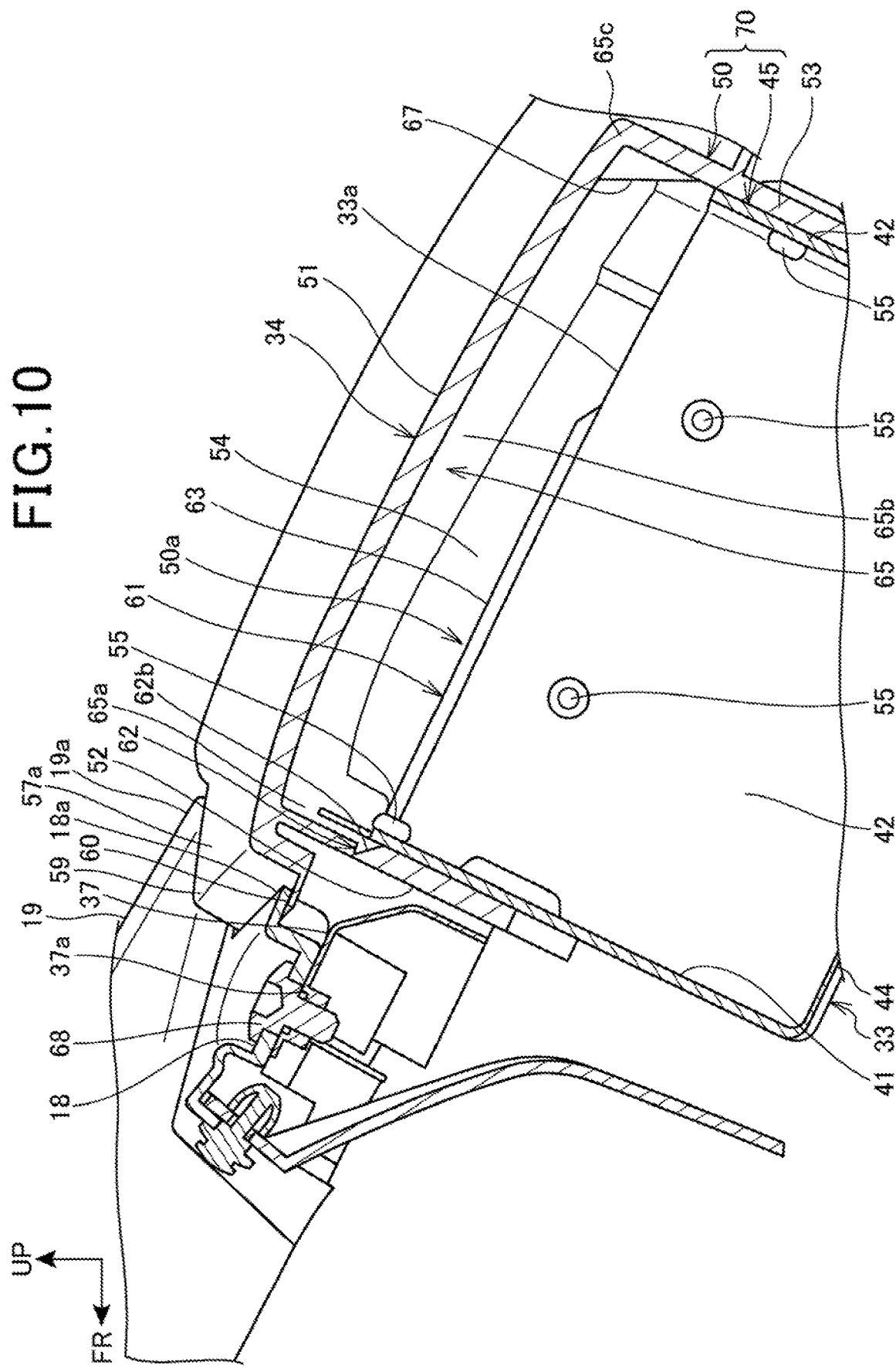
FIG. 10 is a cross-sectional view taken along line X-X in FIG. 4.

FIG. 7 is a plan view of the lid 34, as viewed from above. FIG. 8 is a perspective view of the lid 34, as viewed from a front lower side. FIG. 9 is a cross-sectional view taken along line IX-IX in FIG. 8. FIG. 10 is a cross-sectional view taken along line X-X in FIG. 4. FIG. 10 omits depicting the air bag 35 and the inflator 36.

Reference is made to FIGS. 7 to 10. The lid 34 includes a lid peripheral wall portion 50 and a lid upper wall portion 51 (upper wall portion). The lid peripheral wall portion 50 having a frame shape fits into the retainer peripheral wall portion 45. The lid upper wall portion 51 closes an upper surface of the lid peripheral wall portion 50. The lid 34 covers the retainer upper surface opening 33a.

The lid 34 is formed of a synthetic resin having strength and rigidity lower than strength and rigidity of the metal forming the retainer 33. The lid peripheral wall portion 50 and the lid upper wall portion 51 are integrally formed by resin molding using molds.

The lid peripheral wall portion 50 fits in an upper portion of the retainer peripheral wall portion 45 from above. The lid peripheral wall portion 50 has an inner peripheral portion fitting in an outer peripheral portion of the retainer peripheral wall portion 45.

More specifically, the lid peripheral wall portion 50 includes a lid front wall 52 (front wall), a lid rear wall 53 (rear wall), and a pair of left and right lid side walls 54 (side walls). The lid front wall 52 covers the retainer front wall 41 from the front. The lid rear wall 53 covers the retainer rear wall 42 from the rear. The lid side walls 54 cover the retainer side walls 43 from outer sides.

Reference is made to FIGS. 5, 6, and 8 to 10. The lid 34 is coupled with the retainer 33 by a plurality of fasteners 55. The fasteners 55 pass through the lid peripheral wall portion 50 and the retainer peripheral wall portion 45. In the embodiment, the fasteners 55 are rivets.

The lid front wall 52, the lid rear wall 53, and the lid side walls 54 have a plurality of rivet holes 56 through which the fasteners 55 are passed.

The frame-shaped lid peripheral wall portion 50 defines an upper surface opening 50a in an upper surface of the lid peripheral wall portion 50. The lid upper wall portion 51 closes the upper surface opening 50a.

The lid upper wall portion 51 is formed into a curved shape having a height that is the highest at a central portion in the vehicle width direction and that is curved so as to be lower in height toward both sides in the vehicle width direction with respect to the central portion.

Additionally, the lid upper wall portion 51 is disposed to be lower in height toward the rear in the vehicle side view.

The lid upper wall portion 51 has an eaves portion 57 that extends outward from the lid peripheral wall portion 50 in a plan view. The eaves portion 57 includes a front-side eaves portion 57a and side-portion eaves portions 57b. The front-side eaves portion 57a extends forward relative to the lid front wall 52. The side-portion eaves portions 57b extend outward in the vehicle width direction relative to the lid side walls 54.

The front-side eaves portion 57a has a recessed portion 58 and protruded portions 59. The recessed portion 58, recessed rearward in a plan view, is disposed at the central portion in the vehicle width direction. The protruded portions 59, which protrude forward, are disposed on both sides of the recessed portion 58.

The lid upper wall portion 51 has a plate-shaped flange portion 60. The flange portion 60 is formed around the entire periphery of the lid upper wall portion 51 so as to extend outward from a peripheral edge portion (outer peripheral portion) in a plan view. As depicted in FIG. 10, the flange portion 60 extends forward from a lower edge of the front-side eaves portion 57a at a front edge portion of the lid upper wall portion 51.

The lid 34 has a notched portion 61 as a fragile portion, disposed in a boundary between the lid upper wall portion 51 and the lid peripheral wall portion 50. The notched portion 61 is a groove formed in the lid peripheral wall portion 50.

The notched portion 61 includes a front-surface notched portion 62 and side-surface notched portions 63 (notch). The front-surface notched portion 62 is disposed at an upper edge of the lid front wall 52 of the lid peripheral wall portion 50. The side-surface notched portions 63 are disposed at upper edges of the lid side walls 54 of the lid peripheral wall portion 50. The notched portion 61 as a fragile portion is not provided in an upper portion of the lid rear wall 53 of the lid peripheral wall portion 50.

The front-surface notched portion 62 includes an outer-surface notched portion 62a (notch) and inner-surface notched portions 62b (notches). The outer-surface notched portion 62a is disposed at the center in the vehicle width direction below the recessed portion 58 in the lid upper wall portion 51. The inner-surface notched portions 62b are disposed below the protruded portions 59 of the lid upper wall portion 51.

The outer-surface notched portion 62a is disposed in an outer surface on the upper edge portion of the lid front wall 52 and are exposed to the outside of the lid 34. The inner-surface notched portions 62b are disposed in an inner surface on the upper edge portion of the lid front wall 52 and are not exposed to the outside of the lid 34.

The outer-surface notched portion 62a has outer end portions in the vehicle width direction connected continuously with inner end portions in the vehicle width direction of the respective inner-surface notched portions 62b. The outer end portions and the inner end portions overlap each other in a thickness direction of the lid front wall 52.

The front-surface notched portion 62 extends over an entire length in the vehicle width direction in the lid front wall 52.

The side-surface notched portions 63 are disposed in inner surfaces of the upper edge portions of the respective lid side walls 54 and are not exposed to the outside of the lid 34. The side-surface notched portions 63 extend in the fore-aft direction. The side-surface notched portions 63 have front ends connected continuously with outer end portions in the vehicle width direction of the respective inner-surface notched portions 62b.

The lid 34 has a corner portion 65. The corner portion 65 assumes a portion at which the lid upper wall portion 51 is connected with the upper end portion of the lid peripheral wall portion 50. The corner portion 65 is disposed in an entire periphery of the upper end portion of the lid peripheral wall portion 50. The term "corner portion 65," as used herein, refers to a greater range of a cornered portion in the portion at which the lid upper wall portion 51 is connected with the upper end portion of the lid peripheral wall portion 50. The corner portion 65 thus includes a portion in which the notched portion 61 is provided in the vertical direction.

The corner portion 65 includes a front-side corner portion 65a, side-surface corner portions 65b, and a rear-side corner portion 65c. The front-side corner portion 65a is disposed near an upper end of the lid front wall 52. The side-surface corner portions 65b are disposed near upper ends of the lid side walls 54. The rear-side corner portion 65c connects an upper end portion of the lid rear wall 53 with a rear end portion of the lid upper wall portion 51.

When the lid 34 breaks to open through the activation of the air bag module 31, an expansion force of the air bag 35 ruptures the front-surface notched portion 62 and the side-surface notched portions 63. Because the notched portion 61 is not provided near the rear-side corner portion 65c, an upper portion of the lid rear wall 53 does not rupture. Thus, when the lid 34 breaks to open, the lid upper wall portion 51 rotates toward the rear to open using the rear-side corner portion 65c as a rotational hinge portion and as a starting point.

The upper surface opening 50a through which the air bag 35 passes when deploying upwardly is formed in an upper surface of the lid peripheral wall portion 50 as a result of the lid 34 having broken to open.

The retainer peripheral wall portion 45 and the lid peripheral wall portion 50 constitute a peripheral wall portion 70 of the air bag module 31. The peripheral wall portion 70 surrounds the air bag 35 from outside. The upper surface opening 50a is an opening formed in an upper surface of the peripheral wall portion 70 of the lid peripheral wall portion 50.

As depicted in FIG. 1, the air bag 35 is deployed upwardly toward the front of the lid 34 and is disposed anterior to the seat 14. The air bag 35 thus can adequately protect the occupant sitting in the seat 14.

Reference is made to FIGS. 8 to 10. Ribs 67 are formed at the rear-side corner portion 65c of the lid 34. The ribs 67 connect an inner surface of the upper end portion of the lid rear wall 53 in the peripheral wall portion 70 with an inner surface of the rear end portion of the lid upper wall portion 51.

The ribs 67 are disposed in juxtaposition with each other in the vehicle width direction with a space interposed between each pair of two adjacent ribs 67. The ribs 67 are each plate-shaped members protruding toward the front from the inner surface of the lid rear wall 53 and each have an upper end connected with the inner surface of the rear end portion of the lid upper wall portion 51. The ribs 67 are each disposed so as to have a wall thickness direction oriented along the vehicle width direction.

The plurality of the ribs 67 each have a lower end 67a disposed on a horizontal line H extending in the vehicle width direction. The lower ends 67a are each disposed at positions having a height identical to each other in the vertical direction. The ribs 67 each have an upper end 67b connected with the lid upper wall portion 51. The lid upper wall portion 51, because having a curved shape, has a height variable in the vehicle width direction. Thus, the ribs 67 each have a vertical length variable depending on the position at which the rib 67 is disposed.

More specifically, the ribs 67 have a vertical length that is the longest at the central portion in the vehicle width direction and that decreases toward both sides in the vehicle width direction with respect to the central portion.

The ribs 67 are integrally molded with the lid peripheral wall portion 50 and the lid upper wall portion 51 during integral molding of the lid peripheral wall portion 50 and the lid upper wall portion 51.

The ribs 67 enhance strength and rigidity of the rear-side corner portion 65c of the lid 34. Thus, the degree of opening of the lid upper wall portion 51 when the lid 34 breaks to open and the air bag 35 is deployed can be adjusted with the ribs 67. Specifically, the direction in which the air bag 35 is deployed can be varied by the simple structure including the ribs 67 provided for the lid 34. The degree of opening of the lid upper wall portion 51 can be readily adjusted by changing the number and size of the ribs 67.

Reference is made to FIGS. 4 to 6 and 10. The front-surface reinforcement member 37 is disposed so as to overlap from the front the lid front wall 52 in the fore-aft direction and fixed to the lid front wall 52 by the fasteners 55.

The side-surface reinforcement members 38 are disposed so as to overlap from outer sides the lid side walls 54 in the vehicle width direction and fixed to the lid side walls 54 by the fasteners 55.

The front-surface reinforcement member 37 and the side-surface reinforcement members 38 are formed of a metal material having strength and rigidity higher than the strength and the rigidity of the rein material forming the lid 34. The front-surface reinforcement member 37 and the side-surface reinforcement members 38 are formed of, for example, a ferrous material.

Because the front-surface reinforcement member 37 and the side-surface reinforcement members 38 enhance strength and rigidity of the peripheral wall portion 70, the peripheral wall portion 70 can be prevented from being deformed by inflation of the air bag 35, so that the air bag 35 can be deployed in an appropriate direction.

Additionally, the front-surface reinforcement member 37 and the side-surface reinforcement members 38 are fixed in place using the fasteners 55 that fix the lid peripheral wall portion 50 and the retainer peripheral wall portion 45. The peripheral wall portion 70 thus can be reinforced by a simple structure. The vehicle body covers and other parts can be mounted on the front-surface reinforcement member 37 and the side-surface reinforcement members 38.

Reference is made to FIG. 2. The air bag module 31 includes the lid upper wall portion 51 exposed upwardly through an opening in the center cover 18. The decorative board 19 extends toward the front from the front end portion of the lid upper wall portion 51. The lid upper wall portion 51 is joined to the center cover 18 and the decorative board 19 to thereby constitute an external design surface.

Reference is made to FIG. 4. The decorative board 19 has a rear end edge 19a (end edge) disposed in the recessed portion 58 in the lid upper wall portion 51 between the protruded portions 59 at left and right. The rear end edge 19a overlaps from above the flange portion 60 at the front end of the lid upper wall portion 51 in the vertical direction. The rear end edge 19a and the flange portion 60 form a labyrinth structure. Thus, a space below the decorative board 19 is hard to be visually recognized, so that appearance can be improved.

Reference is made to FIGS. 2, 4, and 10. Portions in the center cover 18 lateral to the decorative board 19 are fixed to fixing portions 37a of the front-surface reinforcement member 37 by bolts 68.

The center cover 18 has an edge portion 18a overlapping from above the flange portion 60 at the front end of the lid upper wall portion 51 in the vertical direction. The edge portion 18a and the flange portion 60 form a labyrinth structure. Thus, a space below the center cover 18 is hard to be visually recognized, so that appearance can be improved.

In the present embodiment, the front-surface reinforcement member 37 and the side-surface reinforcement members 38 prevent the air bag module 31 from being deformed. Thus, the lid upper wall portion 51 can be prevented from being displaced excessively toward the front side during inflation of the air bag 35. As a result, even in the configuration in which the decorative board 19 and the center cover 18 overlap from above the flange portion 60 at the front end of the lid upper wall portion 51 to thereby improve appearance, the lid upper wall portion 51 can be prevented from raising the decorative board 19 and the center cover 18 during inflation of the air bag 35.

The following describes a folding structure of the air bag 35.

FIGS. 11A to 11J are illustrative views illustrating steps for folding the air bag 35. FIG. 12 is an illustrative view of the air bag 35, as viewed from a side, in FIGS. 11A to 11I. FIGS. 11B, 11D, 11F, 11H, and 11J are cross-sectional views taken along line XI-XI in FIGS. 11A, 11C, 11E, 11G, and 11I, respectively. Additionally, FIG. 12 simplifies a shape of the air bag 35 in a thickness direction.

Figure 11:
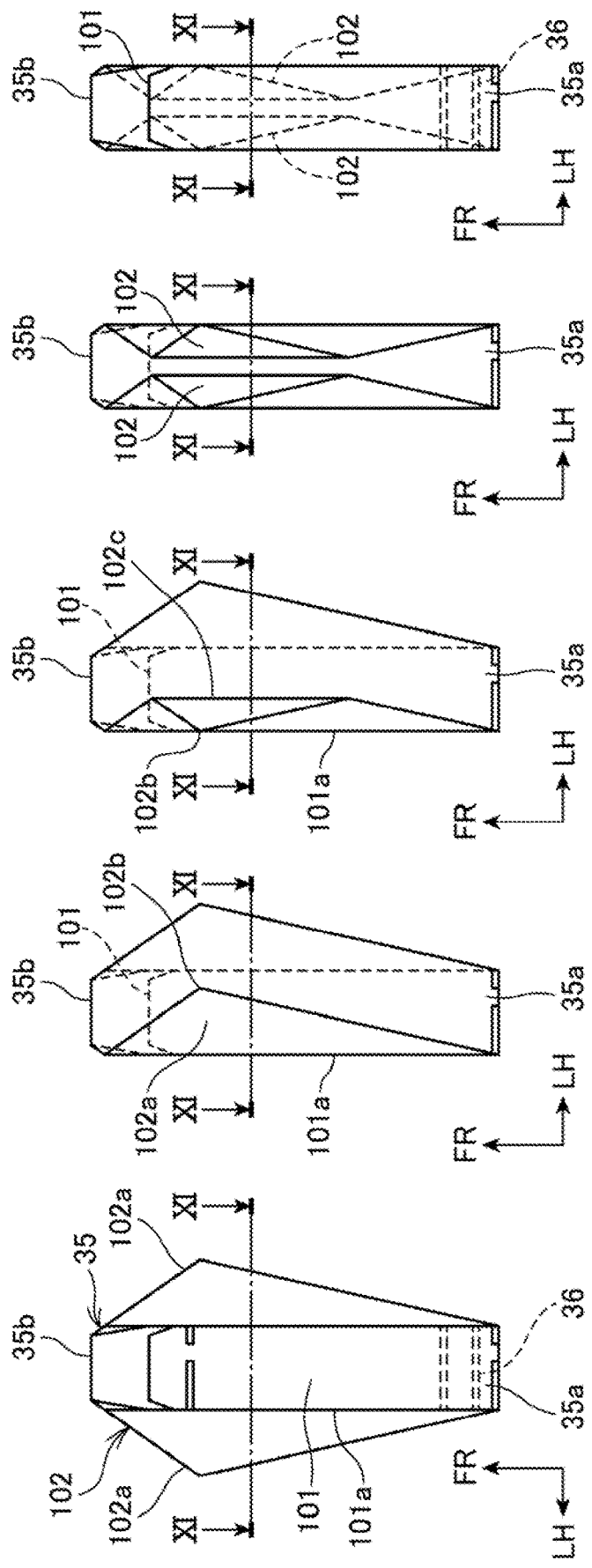
FIGS. 11A to 11J are illustrative views illustrating steps for folding the air bag.
Figure 12:
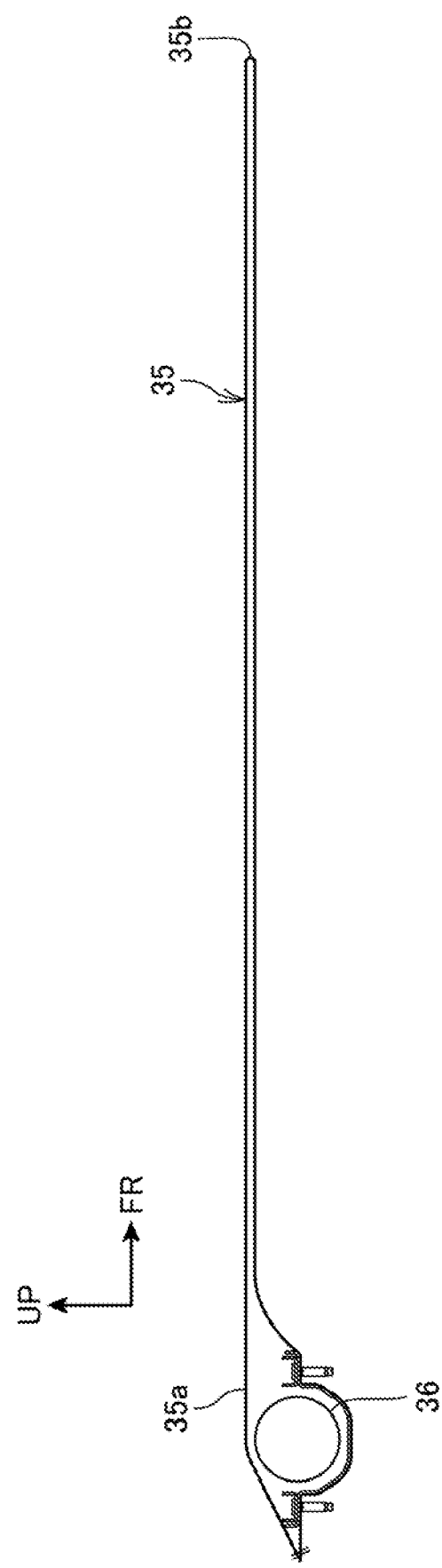
FIG. 12 is an illustrative view of the air bag, as viewed from a side, in FIGS. 11A to 11J.

As depicted in FIGS. 11A and 12, the air bag 35 is a bag extending straight toward the front of the vehicle from a proximal end portion 35a with which the inflator 36 is connected. The inflator 36 is disposed on the side of a lower surface of the proximal end portion 35a of the air bag 35.

Reference is made to FIG. 11B. The air bag 35 includes, in the thickness direction, a bellows portion 101 and a wider-width portion 102. The bellows portion 101 has concertinaed sides in folds. The wider-width portion 102 has a width wider in the vehicle width direction than a width of the bellows portion 101. The wider-width portion 102 is disposed on the side of a lower surface of the air bag 35. The bellows portion 101 is disposed superior to the wider-width portion 102 at a central portion of the wider-width portion 102. In a plan view as viewed from above, the bellows portion 101 has a rectangular shape extending straight to a position near a distal end 35b of the air bag 35. In a plan view, the wider-width portion 102 has bulged portions 102a at left and right. The bulged portions 102a bulge in the vehicle width direction relative to the bellows portion 101.

Reference is made to FIGS. 11C and 11D. A first bulged portion 102a is folded along an outer edge 101a of the bellows portion 101 downwardly and inwardly in the vehicle width direction. FIGS. 11C and 11D depict the air bag 35 turned upside down.

Reference is made to FIGS. 11E and 11F. The first bulged portion 102a is folded back outwardly such that an inner end portion 102b in FIG. 11C overlaps the outer edge 101a of the bellows portion 101. A folding line 102c depicted in FIG. 11E extends substantially in parallel with the outer edge 101a.

Reference is made to FIGS. 11G and 11H, a second bulged portion 102a is folded back in a manner similar to the first bulged portion 102a. The foregoing step results in the air bag 35 being a rectangular shape extending in the fore-aft direction in a plan view.

Reference is made to FIGS. 11I and 11J. The air bag 35 turned upside down a second time, so that the bellows portion 101 is on the upper surface side.

Under the condition depicted in FIGS. 11I and 11J, too, the air bag 35 extends straight toward the front of the vehicle from the proximal end portion 35a as depicted in FIG. 12.

FIGS. 13A to 13D are illustrative views illustrating steps for folding the air bag 35.

Figure 13:
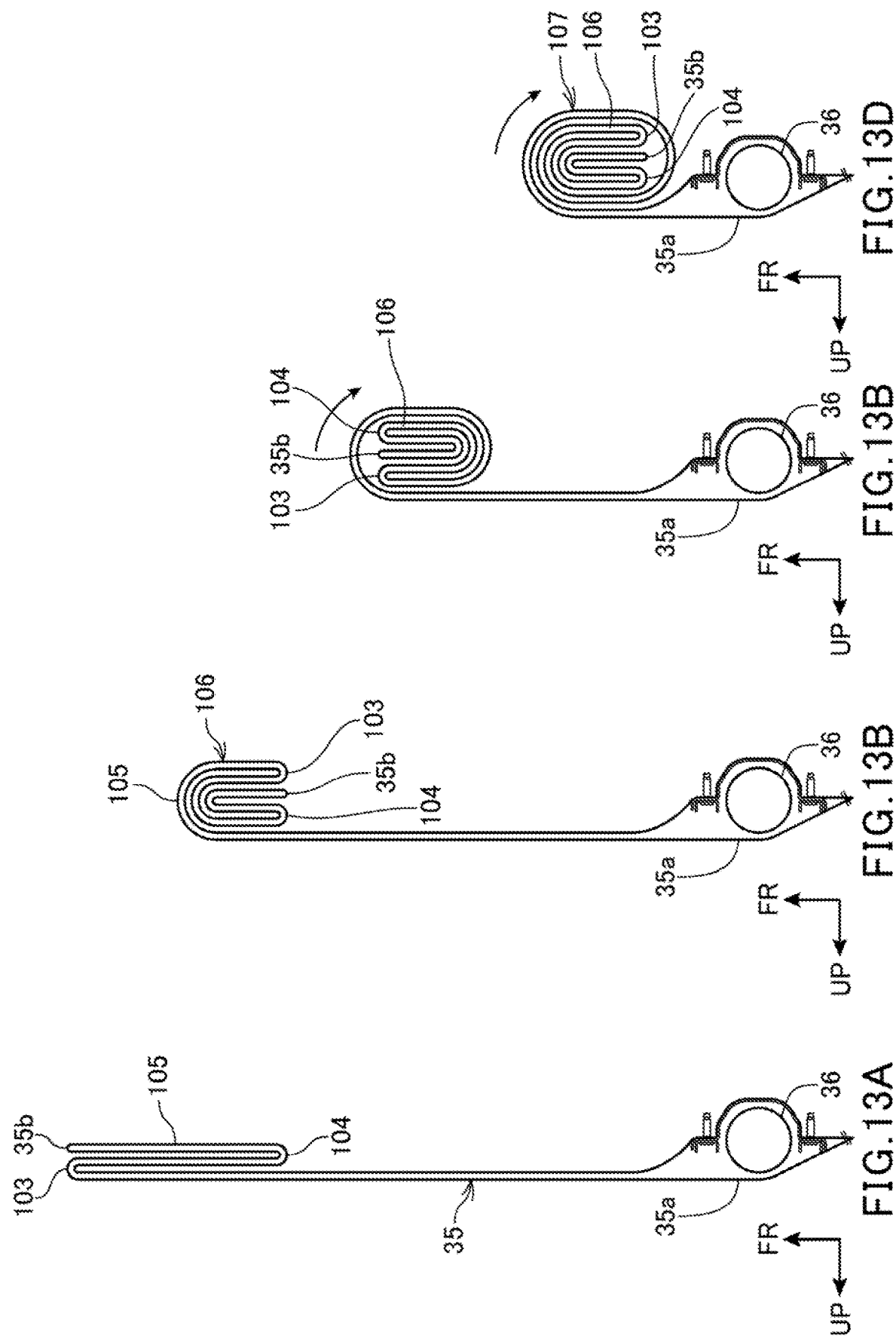
FIGS. 13A to 13D are illustrative views illustrating steps for folding the air bag.

In the air bag 35 under the condition depicted in FIGS. 11I and 11J, the distal end portion is folded a plurality of times (twice) as depicted in FIG. 13A.

More specifically, in FIG. 13A, the air bag 35 has a distal end portion folded downwardly and rearwardly at a first folding portion 103 and folded downwardly and forwardly at a second folding portion 104. The second folding portion 104 is disposed on a side closer to the distal end 35b than the first folding portion 103 is. Under the foregoing condition, the distal end 35b overlaps the first folding portion 103.

As depicted in FIG. 13B, the air bag 35 has an intermediate portion 105 between the first folding portion 103 and the second folding portion 104 folded downwardly and rearwardly. The foregoing step results in a folded portion 106 being formed at the distal end portion of the air bag 35. The folded portion 106 represents the air bag 35 folded a plurality of times at the folding portions extending in the vehicle width direction.

Reference is made to FIGS. 13C and 13D. The folded portion 106 is wound toward the side of the inflator 36 in a direction of forward rotation in a side view. This step results in a roll 107 being formed. The roll 107 represents the air bag 35 wound in a roll form.

Figure 14:
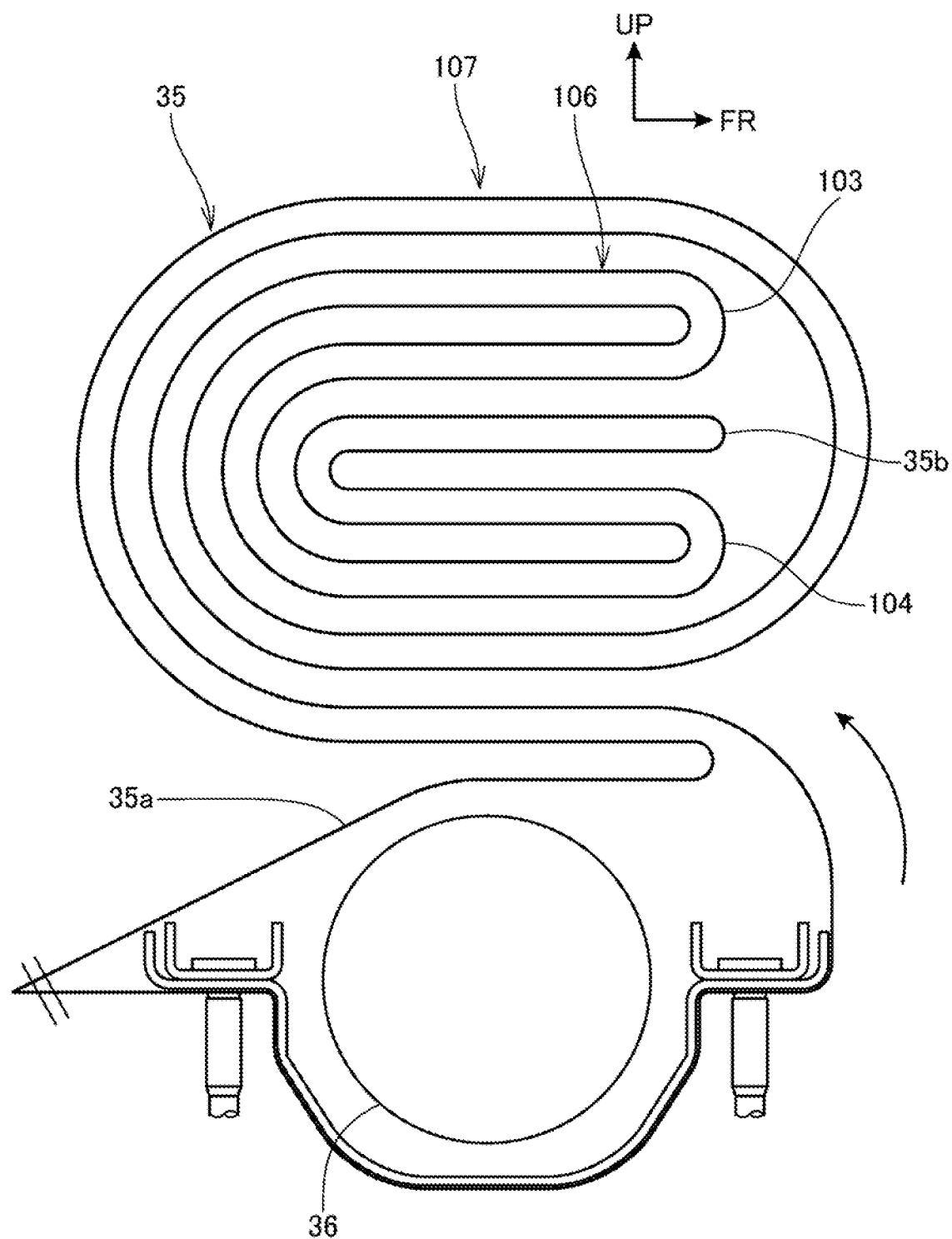
FIG. 14 is a side elevation view of the air bag in a state in which the folding is completed.

FIG. 14 is a side elevation view of the air bag 35 in a state in which the folding is completed.

When the folded portion 106 is wound up to a position at which the folded portion 106 is close to the inflator 36 as depicted in FIG. 13D, the roll 107 is folded back upwardly substantially through 180 degrees in a direction of backward rotation in a side view. This step results in the air bag 35 being in a condition in which the roll 107 is disposed superior to the inflator 36 as depicted in FIG. 14. The air bag 35 under the condition depicted in FIG. 14 is housed inside the air bag module 31.

When the air bag 35 is deployed by gas in the inflator 36 in the present embodiment, the roll 107 first rotates to unroll upwardly toward the front before the folded portion 106 expanding. Thus, the direction in which the air bag 35 is deployed can be varied with the roll 107 and the folded portion 106, so that the occupant can be adequately protected.

As described above, in accordance with the embodiment to which the present invention is applied, the air bag apparatus 30 of the motorcycle 1 includes the air bag 35, the peripheral wall portion 70, and the lid upper wall portion 51. The air bag 35 is disposed anterior to the occupant seat 14. The peripheral wall portion 70 surrounds the air bag 35 from outside. The lid upper wall portion 51 closes the upper surface opening 50a in the peripheral wall portion 70. The air bag 35 is inflated and deployed outward through the upper surface opening 50a. The ribs 67, which connect the upper end portion of the peripheral wall portion 70 with the lid upper wall portion 51, are disposed at the rear-side corner portion 65c forming part of the corner portion 65 that connects the upper end portion of the peripheral wall portion 70 with the lid upper wall portion 51.

The foregoing configuration allows the ribs 67, which connect the upper end portion of the peripheral wall portion 70 with the lid upper wall portion 51, to enhance strength of the rear-side corner portion 65c that forms part of the corner portion 65 that connects the upper end portion of the peripheral wall portion 70 with the lid upper wall portion 51, so that the degree of opening of the lid upper wall portion 51 when the air bag 35 is deployed can be adjusted. Thus, the direction in which the air bag 35 is deployed can be varied using the simple structure including the ribs 67.

The ribs 67 connect the inner surface of the peripheral wall portion 70 with the inner surface of the lid upper wall portion 51. This configuration allows the ribs 67 to be hidden inside the peripheral wall portion 70 and the lid upper wall portion 51, thus improving appearance.

The lid upper wall portion 51 has a curved shape curving in the height direction of the lid upper wall portion 51 and the ribs 67, provided in plurality, have vertical lengths variable according to heights of the lid upper wall portion 51 variable according to a curvature. The foregoing configuration allows the lengths of the ribs 67 to be appropriately set even with the curved shape of the lid upper wall portion 51. Thus, a degree of freedom in the shape of the lid upper wall portion 51 can be ensured and the direction in which the air bag 35 is deployed can be varied through a simple structure incorporating the ribs 67.

The air bag module 31 includes the retainer 33, in which the air bag 35 is housed, and the lid 34 that is mounted on the retainer 33. The retainer 33 includes the retainer peripheral wall portion 45 that surrounds the air bag 35 from outside. The lid 34 includes the lid upper wall portion 51, which covers the upper surface opening 50a, and the lid peripheral wall portion 50, which is fitted in the retainer peripheral wall portion 45 from above. The retainer peripheral wall portion 45 and the lid peripheral wall portion 50 constitute the peripheral wall portion 70. The lid upper wall portion 51 constitutes the upper wall portion. The ribs 67 are disposed in the lid upper wall portion 51 and the lid peripheral wall portion 50.

The foregoing configuration allows the simple structure incorporating the ribs 67, which are disposed in the lid upper wall portion 51 and the lid peripheral wall portion 50 of the lid 34 mounted on the retainer 33, to vary the direction in which the air bag 35 is deployed. Additionally, the structure of the retainer 33 can be simplified because there is no need to provide the retainer 33 with the ribs 67 for adjusting deployment of the air bag 35.

In addition, the decorative board 19 is disposed to be joined to the lid upper wall portion 51 to thereby cover the vehicle body. The lid upper wall portion 51 has the flange portion 60 formed on the outer peripheral portion thereof. The flange portion 60 extends outwardly. The decorative board 19 has the rear end edge 19a overlapping the flange portion 60 from above. The foregoing configuration results in the rear end edge 19a of the decorative board 19 and the flange portion 60 forming a labyrinth structure, so that the space inside the decorative board 19 is hard to be visually recognized and appearance can be improved.

The front-surface reinforcement member 37 and the side-surface reinforcement members 38 are fixed to the outer surface of the peripheral wall portion 70. This configuration allows the front-surface reinforcement member 37 and the side-surface reinforcement members 38 to prevent the peripheral wall portion 70 from being deformed when the air bag 35 is deployed, so that the air bag 35 can be deployed in an appropriate direction. Furthermore, deformation of the decorative board 19 accompanied by the deployment of the air bag 35 can also be prevented.

In a top view, the recessed portion 58, which is recessed inwardly, and the protruded portions 59, which are disposed on both sides of the recessed portion 58, are disposed at the front edge portion of the lid upper wall portion 51. The decorative board 19 is disposed in the recessed portion 58. The peripheral wall portion 70 has the outer-surface notched portion 62a formed in an outer surface thereof at a portion inferior to the recessed portion 58. The peripheral wall portion 70 further has the inner-surface notched portions 62b formed in an inner surface thereof at portions inferior to the protruded portions 59.

The foregoing configuration allows the recessed portion 58 to correctly position the decorative board 19. Additionally, the inner-surface notched portions 62b, disposed on both sides of the outer-surface notched portion 62a, allows the peripheral wall portion 70 to fracture uniformly with ease, when fractured by the notches.

The side-surface notched portions 63 are disposed in the lid side walls 54 at left and right of the peripheral wall portion 70. This configuration allows the lid side walls 54 at left and right of the peripheral wall portion 70 to be fractured by the side-surface notched portions 63, so that the lid upper wall portion 51 can be readily opened during deployment of the air bag 35.

The peripheral wall portion 70 includes the lid front wall 52, which covers the air bag 35 from the front, the lid side walls 54, which cover the air bag 35 from left and right sides, and the lid rear wall 53, which covers the air bag 35 from the rear. The ribs 67 connect the lid rear wall 53 with the lid upper wall portion 51. The foregoing configuration enhances strength of the rear-side corner portion 65c as a portion to connect the upper end portion of the lid rear wall 53 with the lid upper wall portion 51. The foregoing configuration further results in the lid upper wall portion 51 being opened using the upper end portion of the lid rear wall 53 as a starting point. Thus, the air bag 35 can be opened toward the front and the occupant can be appropriately protected.

The foregoing embodiment to which the present invention is applied is illustrative only and is not intended to limit the scope of the present invention.

The above embodiment has been described for a configuration in which the rear-side corner portion 65c in which the ribs 67 are disposed is disposed at the lid rear wall 53 and the lid upper wall portion 51. The configuration is, however, illustrative only and not limiting. For example, instead of the retainer 33 and the lid 34 being provided separately, the upper wall portion may be provided integrally at the upper end of the retainer peripheral wall portion 45 and the ribs are provided in part of the portion connecting the upper wall portion with the retainer peripheral wall portion 45.

The above embodiment has been described for a configuration in which the ribs 67 are disposed at the rear-side corner portion 65c, which forms part of the corner portion 65. The ribs may nonetheless be disposed at the front-side corner portion 65a or the side-surface corner portion 65b, instead of the rear-side corner portion 65c. In this case, the notched portion 61 is disposed at a position such that the notched portion 61 is not disposed on the side of a wall on which the ribs are provided.

The above embodiment has been described for a configuration in which the ribs 67 connect the inner surface of the peripheral wall portion 70 with the inner surface of the lid upper wall portion 51. The configuration is, however, illustrative only and not limiting. For example, the ribs may connect an outer surface of the peripheral wall portion 70 with an outer surface of the lid upper wall portion 51 at the corner portion 65, which connects the upper end portion of the peripheral wall portion 70 with the lid upper wall portion 51, and may thus be disposed on the outer surface of the air bag module 31.

While the embodiment has been exemplarily described as applied to the motorcycle 1 as the saddle riding vehicle, the invention is not limited to the embodiment and the invention is also applicable to a vehicle including a four-wheel passenger vehicle. The invention is also applicable to all types of saddle riding vehicles, including three-wheel saddle riding vehicles having two front or rear wheels and four-or-more-wheel saddle riding vehicles.

DESCRIPTION OF REFERENCE SYMBOLS

1 Motorcycle (Vehicle)
14 Seat
19 Decorative board
19a Rear end edge (End edge)
30 Air bag apparatus
33 Retainer
34 Lid
35 Air bag
37 Front-surface reinforcement member (Reinforcement member)
38 Side-surface reinforcement member (Reinforcement member)
45 Retainer peripheral wall portion
50 Lid peripheral wall portion
50a Upper surface opening
51 Lid upper wall portion (Upper wall portion)
52 Lid front wall (Front wall)
53 Lid rear wall (Rear wall)
54 Lid side wall (Side wall)
58 Recessed portion
59 Protruded portion
60 Flange portion
62a Outer-surface notched portion (Notch)
62b Inner-surface notched portion (Notch)
63 Side-surface notched portion (Notch)
65 Corner portion (portion at which the upper end portion of the peripheral wall portion is connected with the upper wall portion)
65c Rear-side corner portion (part)
67 Rib
70 Peripheral wall portion

The invention claimed is:

1. A vehicle air bag apparatus including an air bag disposed anterior to an occupant seat, a retainer inside which the air bag is housed, and a lid disposed on the retainer, wherein
the retainer includes a retainer peripheral wall portion that surrounds the air bag from outside, and
the lid includes a lid peripheral wall portion that fits to the retainer peripheral wall portion from above, and a lid upper wall portion that covers an upper surface opening of the lid peripheral wall portion,
the air bag being inflated and deployed outward through the upper surface opening,
the lid peripheral wall portion includes a lid front wall that covers the retainer peripheral wall portion from a front, a lid rear wall that covers the retainer peripheral wall portion from a rear, and a pair of left and right lid side walls that cover the retainer peripheral wall portion from sides,
ribs that connect an inner surface of an upper end portion of the lid rear wall with an inner surface of a rear end portion of the lid upper wall portion are formed on the lid,
in a top view, the lid upper wall portion has a recessed portion and protruded portions formed at a front edge portion thereof, the recessed portion being recessed inwardly with the protruded portions disposed on both sides of the recessed portion, and
the lid peripheral wall portion has a notch formed in an outer surface thereof at a portion inferior to the recessed portion and a notch formed in an inner surface thereof at portions inferior to the protruded portions.

2. The vehicle air bag apparatus according to claim 1, wherein the lid upper wall portion has a curved shape that is curved in a height direction of the lid upper wall portion, and
the ribs each have a vertical length variable according to a height of the lid upper wall portion variable according to a curvature of the lid upper wall portion.

3. The vehicle air bag apparatus according to claim 1, further comprising:
a decorative board, disposed to be joined to the lid upper wall portion, for covering a vehicle body, wherein
the lid upper wall portion has a flange portion formed on an outer peripheral portion thereof, the flange portion extending outwardly, and
the decorative board has an end edge overlapping from above the flange portion.

4. The vehicle air bag apparatus according to claim 3, wherein
the decorative board is disposed in the recessed portion.

5. The vehicle air bag apparatus according to claim 1, further comprising:
reinforcement members fixed to an outer surface of the lid peripheral wall portion.

6. The vehicle air bag apparatus according to claim 1, wherein the lid peripheral wall portion has notches formed in left and right side walls thereof.

* * * * *